United States Patent [19]
Oldenhage et al.

[11] Patent Number: 5,475,720
[45] Date of Patent: Dec. 12, 1995

[54] NON-CONDENSABLE GAS TOLERANT CONDENSING CHAMBER

[75] Inventors: Thomas F. Oldenhage; Jack G. Refling, both of Allentown; Michael J. Murphy, White Haven; Roberto I. Reyes, Allentown, all of Pa.; Charles B. Johnson, San Jose, Calif.

[73] Assignee: Pennsylvania Power & Light Company, Allentown, Pa.

[21] Appl. No.: 224,957

[22] Filed: Apr. 8, 1994

[51] Int. Cl.[6] ................................................. G21C 17/035
[52] U.S. Cl. ........................... 376/258; 73/299; 73/301
[58] Field of Search ............................ 376/258; 73/1 H, 73/299, 301

[56] References Cited

U.S. PATENT DOCUMENTS

| | | | |
|---|---|---|---|
| 3,250,123 | 5/1966 | Clayton | 73/301 |
| 3,371,534 | 3/1968 | Akeley | 73/299 |
| 3,886,795 | 6/1975 | Thompson | 73/299 |
| 4,389,888 | 6/1983 | Morooka | 73/299 |
| 4,394,346 | 7/1983 | Morooka | 376/258 |
| 4,567,761 | 2/1986 | Fajeau | 376/258 |
| 4,716,014 | 12/1987 | Cantineau | 376/258 |
| 4,765,945 | 8/1988 | Walleser | 376/258 |
| 5,024,802 | 6/1991 | Srinivasan | 376/258 |
| 5,131,264 | 7/1992 | Jensen | 73/49.2 |
| 5,246,034 | 9/1993 | Higgins et al. | 137/589 |
| 5,249,593 | 10/1993 | Higgins et al. | 137/489 |
| 5,282,491 | 2/1994 | Higgins et al. | 137/489 |
| 5,365,555 | 11/1994 | Sawabe et al. | 376/258 |

OTHER PUBLICATIONS

P. F. Peterson et al., "Gas–Concentration Measurements and Analysis for Gas–Loaded Thermosyphons," *Journal of Heat Transfer*, vol. 110, pp. 743–747 (Aug. 1988).
D. Hein et al., "The Distribution Of Gas In A U–Tube Heat Exchanger And Its Influence On The Condensation Process," *Proceedings of the 7th International Heat Transfer Conference*, Munich, Germany, vol. 5, pp. 467–474 (1982).
D. K. Edwards et al., "Heat and Mass Transfer in the Vicinity of the Vapor–Gas Front in a Gas–Loaded Heat Pipe," *Journal of Heat Transfer*, vol. 94, Series C., No. 2, pp. 155–162 (May 1972).
K. Huikata et al., "Non–Condensable Gas Effect On Condensation In A Two–Phase Closed Thermosyphon," *Int. J. Heat Mass Transfer*, vol. 27, No. 8, pp. 1319–1325 (1984).
Northeast Utilities, "Update of Information Regarding Potential Reactor Vessel Level Deficiencies," Reportable Event Number: 23876 (Jul. 1992).
BWR Owners' Group, "Meetings With NRC On Water Level Instrumentation," (Jun. 3, 1993)(with attachments).
BWR Owners' Group, "Summary of May 18, 1993 EOC Conference Call on Reactor Water Level Program," (May 19, 1993)(with attachments).
BWR Owners' Group, "BWR Reactor Vessel Water Level Instrumentation," BWROG Report, (Aug. 28, 1992)(with enclosures).

*Primary Examiner*—Daniel D. Wasil
*Attorney, Agent, or Firm*—Ratner & Prestia

[57] ABSTRACT

A liquid level instrumentation measurement system for measuring the level of liquid under high pressure in a pressure vessel containing liquid and vapor with non-condensable gases. The system includes a reference leg outside the pressure vessel, a condensing chamber at the upper end of the reference leg defining a vapor space in which vapor condenses to keep the reference leg filled with liquid, a variable leg connected near the bottom of the pressure vessel, and a differential pressure detector connected to both the variable leg and the reference leg for generating a signal proportional to the level of liquid in the pressure vessel. A vent outlet is disposed in the condensing chamber to which a vent leg is connected. The vent leg may be disposed between the vent outlet in the condensing chamber and the variable leg or between the vent outlet and the head vent line which connects the pressure vessel to a main vapor line. In either case, the vent leg removes the non-condensable gases from the vapor space of the condensing chamber.

16 Claims, 5 Drawing Sheets

NON-CONDENSABLE GAS TOLERANT CONDENSING CHAMBER

FIELD OF THE INVENTION

This invention relates generally to water level instrumentation for measuring the water level in the reactor vessel of a boiling water reactor or in the pressurizer or steam generator of a pressurized water reactor and, more particularly, to a non-condensable gas tolerant condensing chamber used as a component in such instrumentation. Condensing chambers are used in many industries to provide a constant reference for liquid level measurement instrumentation.

BACKGROUND OF THE INVENTION

Instrumentation is widely used to measure the level of a coolant, such as water, in the reactor vessel of a boiling water reactor or in the pressurizer or steam generator of a pressurized water reactor as well as of a common boiler. Although other coolants may be used, the most common coolant used in boilers and reactors is water. Therefore, the coolant will be referred to hereinafter as water.

The results of water level measurement are important data necessary for the water level control, feed-water control, and other safety measures for the boiler or reactor. Accordingly, the water level instrumentation measurement system must operate correctly within a given allowable error even in case of an accident, such as a leak or break in the coolant system boundary. The output of the water level instrumentation measurement system is supplied to various control machinery and equipment such as (in the case of nuclear reactors) the reactor protection system, the water level control machinery and equipment, and the water supply control system for maintaining the safety of the reactor. Therefore, the water level instrumentation measurement system must provide correct water level signals even in the case of a nuclear reactor accident.

The Water Level Instrumentation Measurement System

Figure 1:
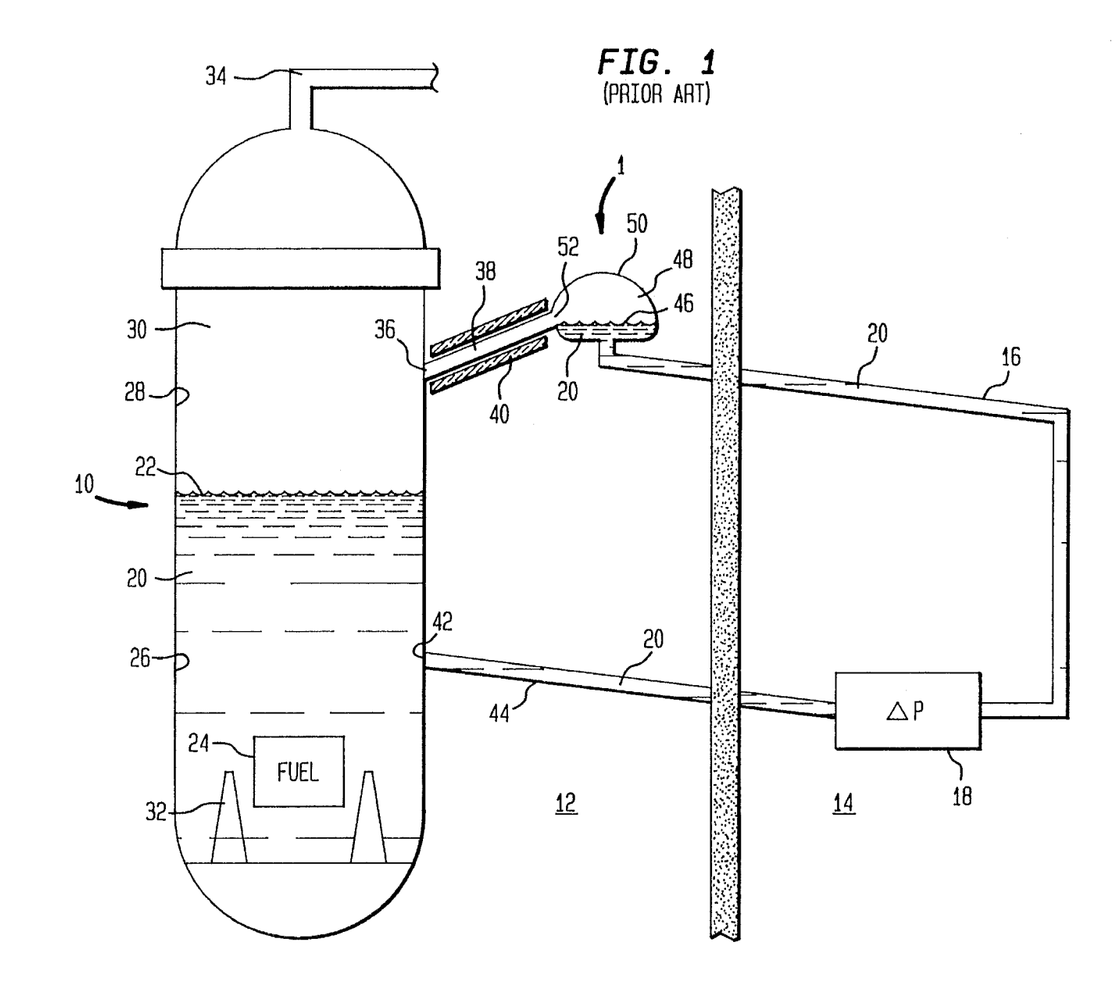
FIG. 1 is a schematic diagram of a conventional water level instrumentation measurement system.

The instrumentation of the type mentioned above is conventionally known and is illustrated in FIG. 1 as applied to a pressurized water reactor or a boiling water reactor. The water level instrumentation measurement system 1 is attached to a pressure vessel 10. Pressure vessel 10 and most of water level instrumentation measurement system 1 are disposed in a drywell (or primary containment) 12 adjacent the reactor building 14. A portion of water level instrumentation measurement system 1, including a reference leg 16 and a differential pressure detector 18, is located in reactor building 14.

Sufficient cooling water 20 is supplied to pressure vessel 10 to provide a water level 22 covering the reactor fuel 24. Cooling water 20 is confined in the lower space 26 of pressure vessel 10 below water level 22. Fuel 24 is supported in pressure vessel 10 by a base 32 and heats cooling water 20. When the reactor is operated in a normal state, cooling water 20 in pressure vessel 10 is heated and high-temperature (about 550° F.), high-pressure (about 1,000 psia) steam 30 is collected in the upper space 28 of pressure vessel 10 above water level 22. Steam 30 is transmitted to, for example, a steam turbine (not shown) through a main steam line 34.

Water level instrumentation measurement system 1 is attached to pressure vessel 10 through an upper tap 36, above water level 22, via a steam inlet 38. Steam inlet 38 is about 1 inch in diameter, upwardly inclined, and surrounded by insulation 40. Insulation 40 may be reflective metallic, asbestos, perlite, or the like. At least one condensing chamber 50 is connected to steam inlet 38. Reference leg 16 connects condensing chamber 50 to differential pressure detector 18. Water level instrumentation measurement system 1 returns to pressure vessel 10 through a lower tap 42, below water level 22, via a variable leg 44.

Water level instrumentation measurement system 1 shown in FIG. 1 operates by measuring the difference in pressure between two columns of water. Steam 30 from pressure vessel 10 is directed through upper tap 36 and steam inlet 38 to condensing chamber 50. Because the temperature of the chamber wall of condensing chamber 50 is lower than the temperature of introduced steam 30, steam 30 condenses on the chamber wall defining vapor space 48. Steam 30 condensing in condensing chamber 50 fills and then maintains a constant water height in reference leg 16. The temperature of water 20 a short distance from condensing chamber 50 in reference leg 16 is about 150° F. It is extremely important for proper measurement of water level 22 that a constant height of water be maintained in reference leg 16. Moreover, the pressures inside both upper space 28 of pressure vessel 10 and vapor space 48 of condensing chamber 50 are maintained at the same level.

The water surface 46 inside condensing chamber 50 never rises above the bottom edge of the opening 52 of steam inlet 38 into condensing chamber 50. This is because the upward incline of steam inlet 38 allows steam inlet 38 to serve as a drain pipe. Excess condensate returns to pressure vessel 10 through steam inlet 38.

The elevation of condensing chamber 50 is higher than that of differential pressure detector 18 in reactor building 14. Variable leg 44 (through lower tap 42) connects to pressure vessel 10 at an elevation below the bottom of the pressure vessel water level range which water level instrumentation measurement system 1 will measure. The variable level water column height varies as pressure vessel water level changes; the reference leg water column height should remain constant. Differential pressure detector 18 in reactor building 14 measures the pressure difference between reference leg 16 and variable leg 44 and converts it (using the values of density of water and steam in pressure vessel 10) to a water level indication for use during plant operation.

Ideally, steam inlet 38 which connects condensing chamber 50 to pressure vessel 10 should have minimal energy loss. Insulation 40 is provided around steam inlet 38 for this purpose. Assuming minimal energy loss from steam inlet 38, most of the condensation of steam 30 will occur in condensing chamber 50.

Steam 30 produced in pressure vessel 10 contains trace amounts of non-condensable gases. In the nuclear industry, non-condensable gases are generated as part of the fission process and are primarily a stoichiometric mixture of hydrogen and oxygen (but include smaller amounts of other elements such as nitrogen). In other applications, the source of these non-condensable gases is air. Steam 30 from pressure vessel 10 carries the non-condensable gases with it to condensing chamber 50.

When steam 30 enters condensing chamber 50 and condenses, gases are not condensed and, hence, remain to raise the concentration of the non-condensable gases in vapor space 48 of condensing chamber 50. As the concentration of the non-condensable gases increases in condensing chamber 50, some of the gases will go into solution in water 20 in condensing chamber 50. The condensate (with its dissolved gases) will spill out of condensing chamber 50 and return to pressure vessel 10—maintaining a constant height of water in reference leg 16. The condensate returning from condensing chamber 50 to pressure vessel 10 carries dissolved, non-condensable gases back to pressure vessel 10. At equilibrium, with no leak in reference leg 16, the surplus condensate (spillover flow) will exit condensing chamber 50 through steam inlet 38 such that its mass flow rate will be equivalent to that entering from pressure vessel 10. Moreover, the accumulation or build-up of non-condensable gases in condensing chamber 50 will reach an equilibrium: the amount of non-condensable gases dissolved in the condensate returning to pressure vessel 10 from condensing chamber 50 equals the amount of non-condensable gases carried by steam 30 to condensing chamber 50.

Thus, the primary mechanism for removal of the non-condensable gases from condensing chamber 50 to pressure vessel 10 is via the dissolved gases contained in the spillover flow. When an ideal system is working properly, non-condensable gases should not accumulate in condensing chamber 50 beyond the equilibrium level. Under these ideal conditions, the amounts typically expected for oxygen and hydrogen in steam 30 are 13 ppmv and 25 ppmv (parts per million by volume), respectively. An equilibrium concentration of non-condensable gases is also present in the condensate returning to pressure vessel 10 via steam inlet 38. To arrive at this equilibrium, the equilibrium concentration of each non-condensable gas in condensing chamber 50 is based on Henry's Law.

B. The Problem

1. Non-Condensable Gas Accumulation

There are two primary ways in which non-condensable gases can accumulate in condensing chamber 50 in excess of the ideal equilibrium condition. First, a leak out of reference leg 16 may reduce spillover flow and limit the non-condensable gas removal. Such a leak condition could cause water surface 46 in condensing chamber 50 to decrease below the lower edge of opening 52, thereby eliminating the ability of the non-condensable gases to be removed from condensing chamber 50 via the spillover flow.

Second, the amount of gas that may be dissolved in water is directly proportional to the partial pressure of gas above the water surface, according to Henry's Law (which states that the concentration of dissolved gas in water is a product of the gas solubility in water, a parameter dependent upon temperature, and the partial pressure of the gas above the water's free surface). Gas is released or "stripped" from the return condensate flow (which is "degassed") because the partial pressure of non-condensable gases in steam inlet 38 is less than the concentration in condensing chamber 50; thus, the dissolved gas in the condensate return is not in equilibrium with the partial pressure of the gas in steam inlet 38. This stripping action provides a concentrating mechanism that returns non-condensable gases to vapor space 48 above reference leg 16. Stripping is accelerated in turbulent flows, as would be encountered in sloped pipe segments, and at nucleation sites on the pipe walls, which would increase in number with increases in pipe length.

In short, a degassing of the condensate (spillover) flow which is returning to pressure vessel 10 may release non-condensable gasses. The rate of degassing increases with the length of steam inlet 38 and with discontinuities in the spillover flow caused by pipe bends, varying pipe cross-sectional area, burrs, gaps, or roughness on the inside of steam inlet 38. These degassed non-condensables will be returned to condensing chamber 50 with the upward flow of steam 30 from pressure vessel 10.

Through one or both of these mechanisms (or other mechanisms not yet known), therefore, non-condensable gases may collect in excess of the ideal condition in condensing chamber 50 at the top of reference leg 16.

2. Migration Into Reference Leg

As steam condensate flows down the walls of condensing chamber 50 and into reference leg 16 to maintain the reference leg liquid inventory, there is a potential for non-condensable gases to dissolve into water 20 in condensing chamber 50 and to migrate into reference leg 16. This dissolved gas solution could be carried into reference leg 16 via diffusion, thermal convection, a leak in reference leg 16, or a combination thereof. The fastest means of conveying any high-concentration solution into reference leg 16 would be a leak. Very small water leaks (less than 0.1 lbm/hr) are all that are needed to bring reference leg 16 to an equilibrium level of dissolved, non-condensable gases in reference leg 16. Over time, non-condensable gases may accumulate in reference leg 16 of water level instrumentation measurement system 1.

3. Release Upon Depressurization

During depressurization, gas comes out of solution and, eventually, may form a bubble. The non-condensable gases dissolved in water 20 in reference leg 16 may come out of solution as reference leg 16 depressurizes. Depressurization may occur slowly under normal operating conditions (such as shutdown) or rapidly under transient or emergency conditions. During a large break loss of coolant accident (LOCA), for example, non-condensable gases in reference leg 16 could come rapidly out of solution. In either case, the non-condensable gases expand and can displace much of the water contained in reference leg 16.

In summary, all three of the following events must occur to cause such displacement: (1) an elevated level of non-condensable gases must exist in condensing chamber 50; (2) the gases must be drawn into reference leg 16 by, for example, a small leak in a fitting, valve, manifold, or the like; and (3) depressurization must occur.

It has been demonstrated that non-condensable gases in solution in reference leg 16 can cause significant errors in measuring water level 22 during rapid depressurization and normal shutdowns (slow depressurizatons). This error is due to displacement of water 20 in reference leg 16 as the non-condensable gases come out of solution and expand as the pressure drops. The amount of water 20 lost from reference leg 16 depends upon the geometry of reference leg 16, the amount and composition of initial non-condensable gases, and the depressurization rate. Water loss in reference leg 16 directly impacts the reference pressure sensed by differential pressure detector 18 and, consequently, the measurement of water level 22 in pressure vessel 10. The result is a non-conservative (high) measurement.

The concern with errors in measuring water level 22 during normal depressurization was confirmed during 1992. An operating boiling water reactor plant experienced an automatic reactor trip and was implementing a plant cooldown when operators observed momentary increases in indicated water level ("notching"). After the coolant system depressurized to significantly below the coolant setpoint of 98 psig, indicated water level became erratic and a 32-inch error developed. An extended period elapsed before the error was recovered.

Incorrect measurements of water level 22 during normal operations present one set of problems. Because operators use such measurements when implementing emergency operating procedures during abnormal conditions to determine whether adequate core cooling is achieved, however, an erroneous high indication of water level 22 would result in ambiguous or misleading information to the operators during a dynamic depressurization event. This creates another, potentially catastrophic, set of problems.

Clearly, some modification of water level instrumentation measurement system 1 is required to prevent non-condensable gases from accumulating in reference leg 16. The priority for this modification is high because intrusion of non-condensable gases into reference leg 16 can render water level indication indeterminate and inaccurate. The Nuclear Regulatory Commission (NRC), in NRC Bulletin 93-03 dated May 28, 1993, required all boiling water reactor licenses to implement a hardware modification to their water level instrumentation measurement systems "to ensure the level instrumentation system design is of high functional reliability for long-term operation. This includes level instrumentation performance during and after transient and accident scenarios initiated from both high pressure and reduced pressure conditions." The modification was required to be implemented before reactor start up following any shut down to a "cold shut down" condition after Jul. 31, 1993.

C. Attempted Solutions

The boiling water reactor industry embarked on a program in July 1992 to address and resolve the identified concern with reactor water level instrumentation measurement system 1. To solve the problem, one of the three causes (identified above) must be removed. Depressurization must and will occur. It is difficult to prevent the minor leaks that can draw non-condensable gases into reference leg 16. Efforts have focused, therefore, on removing non-condensable gases from condensing chamber 50 before elevated levels can accumulate.

To provide a viable solution, the modification to water level instrumentation measurement system 1 should be transparent to the operator. It must not offset water level 22 during operation. Preferably, it will avoid active components and require neither maintenance nor operator activities to ensure proper operation. Finally, as modified, water level instrumentation measurement system 1 must be in service continuously.

A number of alternative modifications to water level instrumentation measurement system 1 have been proposed to solve the problem of measurement errors caused by non-condensable gases. One proposal tentatively selected by the industry (i.e., the Boiling Water Reactor Owners' Group) is to vent condensing chamber 50 to the main steam line. This modification uses positive steam flow through condensing chamber 50 to prevent non-condensable gases from accumulating in condensing chamber 50.

The main steam line is subject, however, to pressure fluctuations measured in many feet of water. These pressure fluctuations cause significant signal noise in the water level instrumentation, which generates a water level signal from a pressure differential measured in inches of water. Thus, the water level signal obtained when condensing chamber 50 is vented to the main steam line is both inaccurate and full of noise.

A second proposed modification is to add an accumulator below condensing chamber 50 to reduce the water level measurement error to a small, quantifiable value. The utility industry has rejected this proposal. Although it improves the operation by restricting the error to a known value, the proposed modification fails to address any of the causes of the error.

A third proposed modification is to manually backfill reference leg 16 with regular frequency. The utility industry rejected this proposal because it would require extensive maintenance support. Although the frequency of backfill which would be required is indeterminate, there is no doubt that the time between required backfill steps would be very short. Moreover, a certain level of operational risk would accompany each backfill operation.

An automatic keepfill system, providing continuous backfill of reference leg 16, is a fourth possible solution. The NRC Staff endorsed the continuous backfill modification as an acceptable solution to the degassing problem. Such a system is under investigation, and has been adopted by much of the utility industry, but requires relatively extensive modifications to piping and valving. Moreover, the keepfill system may not be feasible at certain plants.

A fifth proposed modification is to install a temperature monitor on condensing chamber 50 and backfill only when the temperature decreases. The utility industry has rejected this proposal. Decreasing temperature may needlessly require plant shutdown for containment entry. Moreover, the temperature instrumentation would require maintenance, penetrations of containment would be required to install cable, and operator interface would be required to monitor the temperature.

Sixth, it has been proposed that the condensing chamber be placed below the vessel nozzle. The utility industry has rejected this alternative because it would introduce a downward-sloped section of pipe (from the pressure vessel to the condensing chamber). Operators would not know whether that section of pipe was full of water.

Finally, the concept of venting condensing chamber 50 to variable leg 44 has been proposed. Such a modification would use steam flow through condensing chamber 50 to prevent non-condensable gases from accumulating in condensing chamber 50. The timing of responses required by NRC Bulletin 93-03 effectively discouraged utilities from pursuing this modification, especially because the NRC Staff stated that it would have a lot of questions regarding installation of such a modification. The utility industry has not pursued the concept of venting condensing chamber 50 to variable leg 44, electing instead to adopt an automatic keepfill system as accepted by the NRC.

To overcome the shortcomings of existing water level instrumentation measurement systems, a modified water level instrumentation measurement system is provided. An object of the present invention is to provide an improved system that measures the water level in a pressure vessel in a stable manner even in the case of a LOCA, depressurization event, or transient. A related object is to provide, as one component of the water level instrumentation measurement system, a condensing chamber which tolerates non-condensable gases present in the system. Another object is to prevent the accumulation of non-condensable gases in condensing chambers.

SUMMARY OF THE INVENTION

To achieve these and other objects, and in view of its purposes, the present invention provides a liquid level instrumentation measurement system for measuring the level of liquid under high pressure in a pressure vessel containing liquid and vapor with non-condensable gases. The system includes a reference leg outside the pressure vessel, a condensing chamber at the upper end of the reference leg defining a vapor space in which vapor condenses to keep the reference leg filled with liquid, a variable leg connected below the liquid surface in the pressure vessel, and a differential pressure detector connected to both the variable leg and the reference leg for generating a signal proportional to the level of liquid in the pressure vessel. A vent outlet is disposed in the condensing chamber to which a vent leg is connected. The vent leg may be disposed between the vent outlet in the condensing chamber and the variable leg or between the vent outlet and the head vent line which connects the pressure vessel to a main vapor line at lower pressure. In either case, the vent leg removes the non-condensable gases from the vapor space of the condensing chamber.

It is to be understood that both the foregoing general description and the following detailed description are exemplary, but are not restrictive, of the invention.

BRIEF DESCRIPTION OF THE DRAWING

The invention is best understood from the following detailed description when read in connection with the accompanying drawing, in which.

DETAILED DESCRIPTION OF THE INVENTION

Referring now to the drawing, wherein like reference numerals refer to like elements throughout, FIG. 1 illustrates a conventional water level instrumentation measurement system 1 as discussed in detail above. The remaining Figures represent modifications to water level instrumentation measurement system 1 in accordance with the present invention. It is emphasized that, according to common practice in representation, the various components of the drawing are not to scale. On the contrary, the dimensions of the various components are arbitrarily expanded or reduced for clarity.

Figure 2:
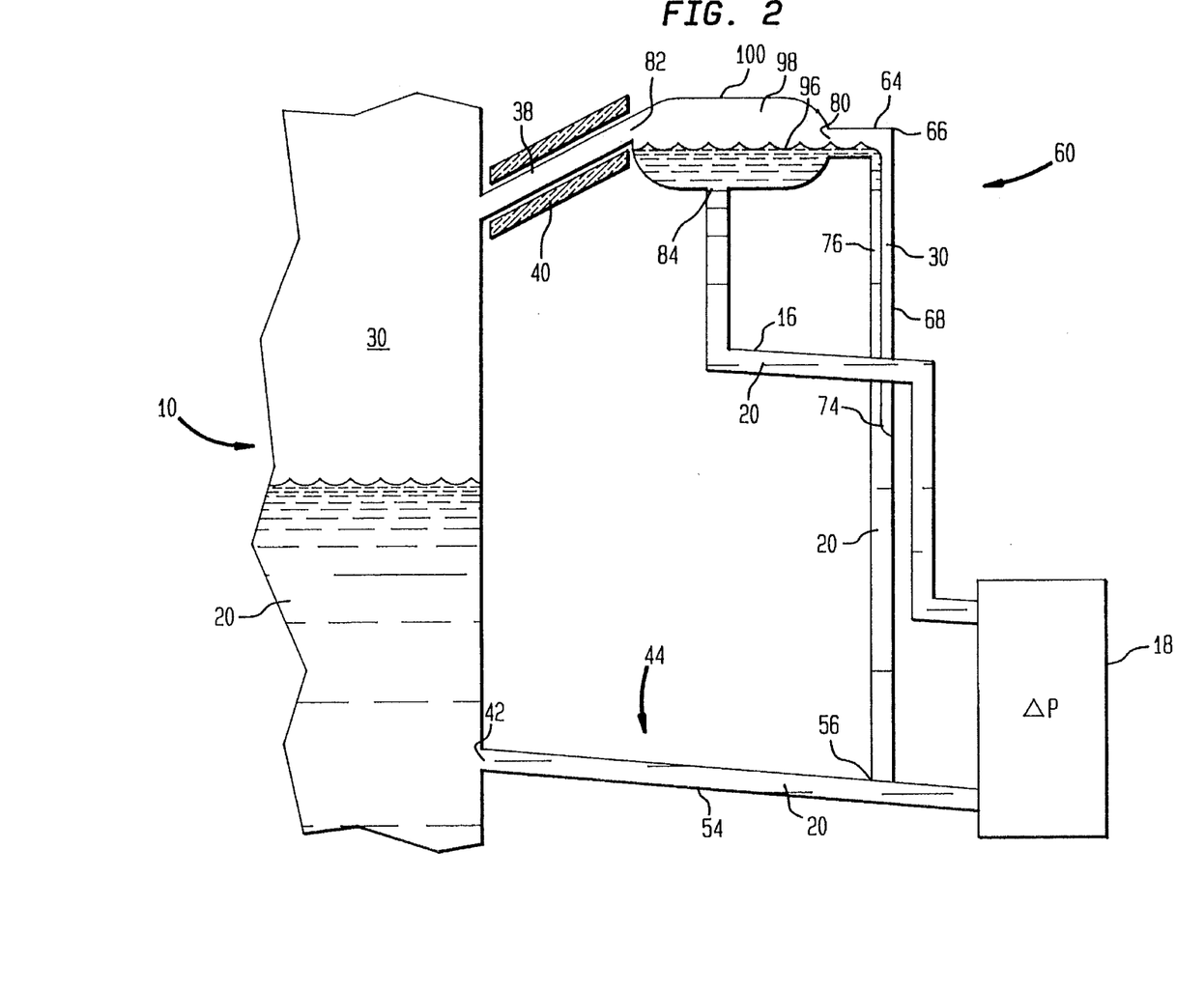
FIG. 2 is a schematic diagram of a first modification of the conventional water level instrumentation measurement system (shown in FIG. 1) according to the present invention—illustrating a vent to the variable leg of the system.
Figure 3:
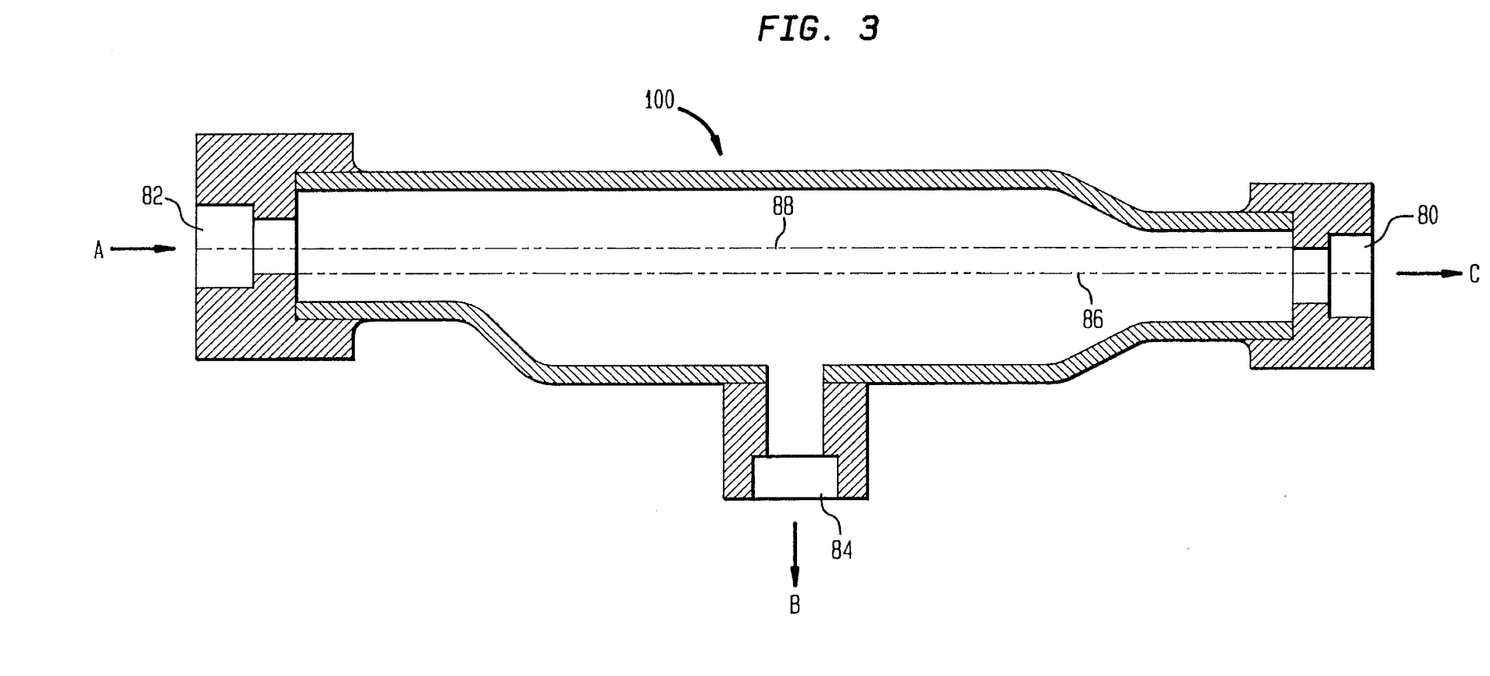
FIG. 3 highlights the condensing chamber of the first modification shown in FIG. 2.
Figure 4:
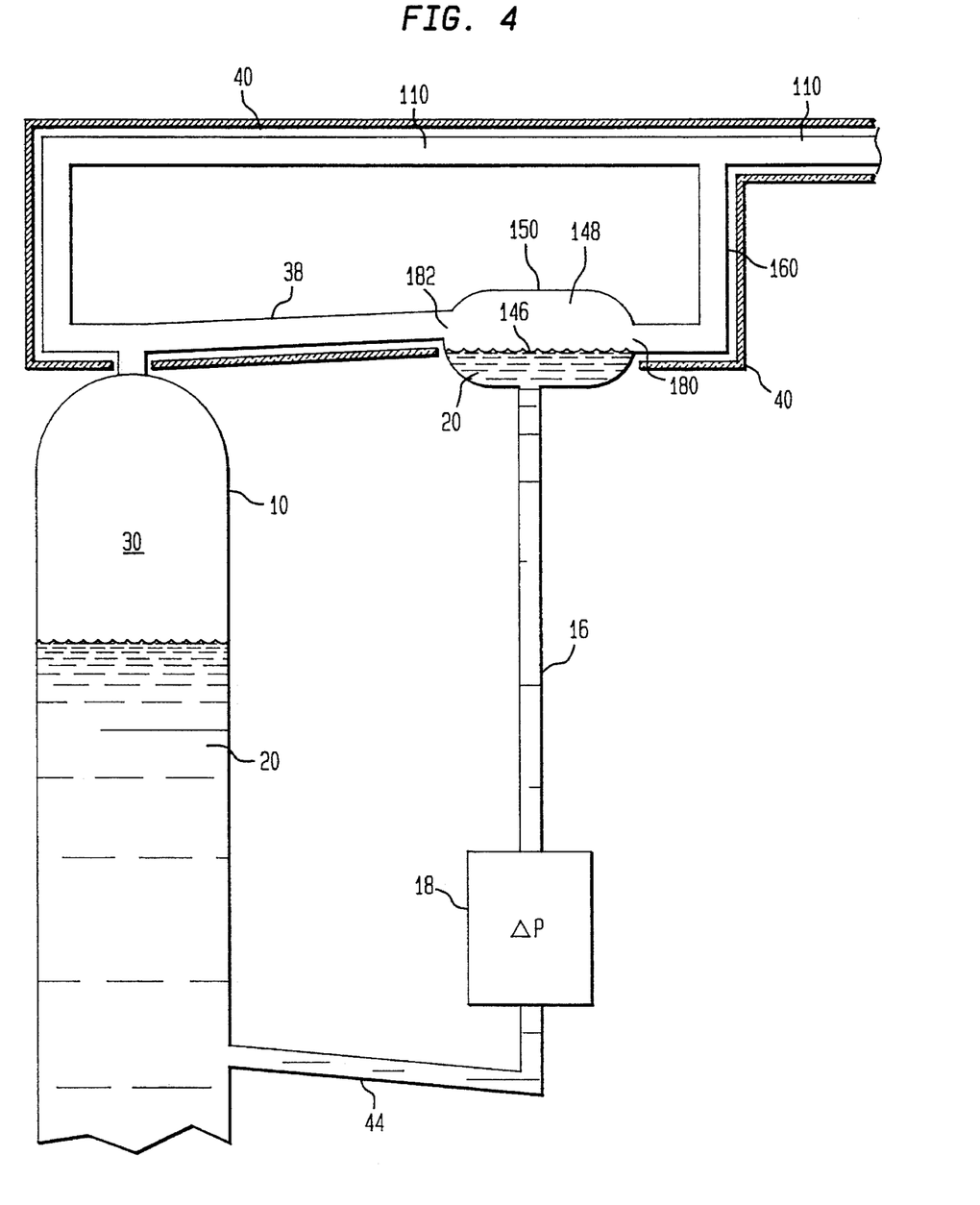
FIG. 4 is a schematic diagram of a second modification of the conventional water level instrumentation measurement system (shown in FIG. 1) according to the present invention—illustrating a vent to the main steam line.
Figure 5:
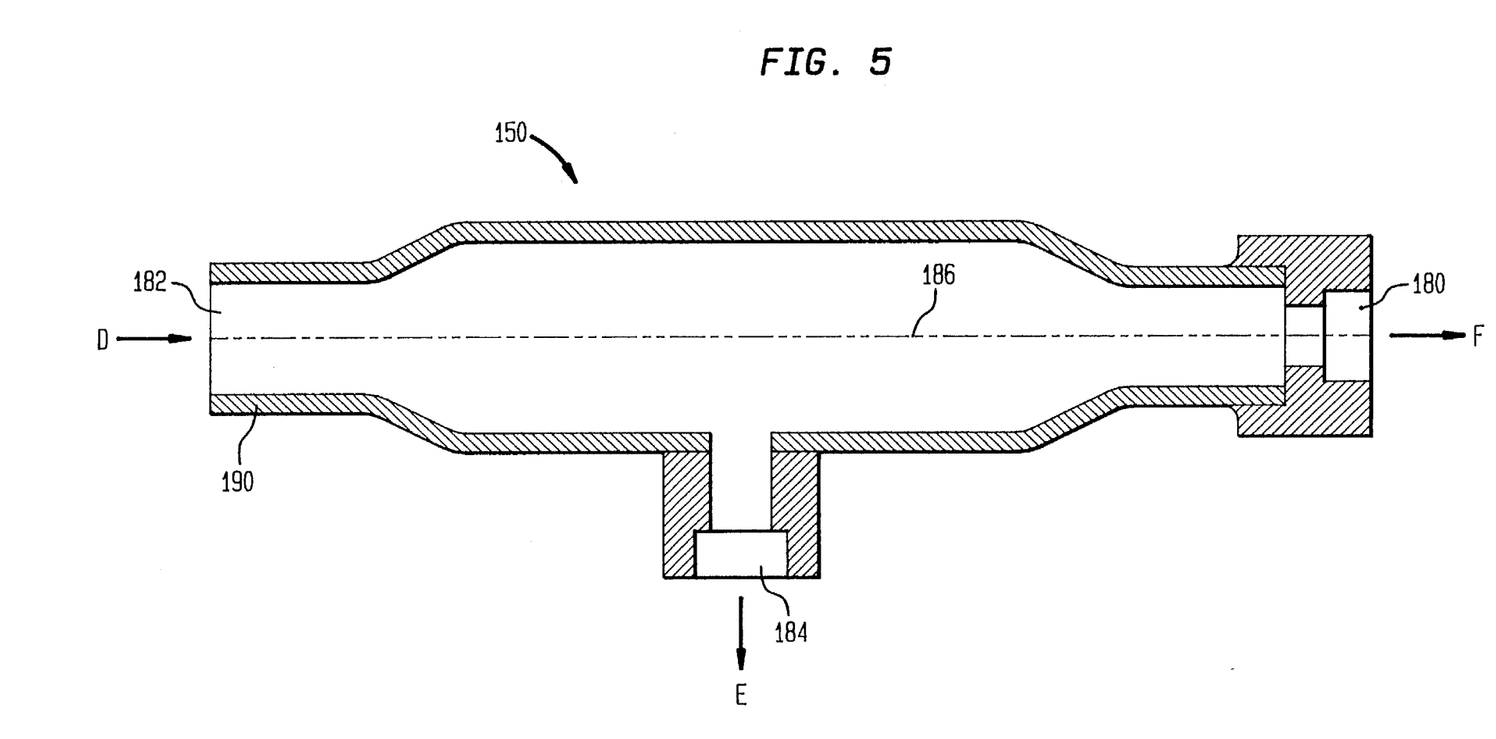
FIG. 5 highlights the condensing chamber of the second modification shown in FIG. 4.

To address the problem of measurement error introduced by non-condensable gases, two passive modifications which prevent the accumulation of non-condensable gas in condensing chamber 50 are provided. Both of these modifications add a vent to a redesigned condensing chamber to provide a path to remove non-condensable gases. FIGS. 2 and 3 illustrate the first modification, in which the vent is added to variable leg 44, and FIGS. 4 and 5 illustrate the second modification, in which the vent is added to the main steam header.

A. Vent to Variable Leg Modification

In the vent to variable leg modification, shown in FIGS. 2 and 3, non-condensable gases are carried into the vent leg 60 (by the flow and condensation of steam 30) where the non-condensable gases are dissolved into water 20 and returned to pressure vessel 10 through variable leg 44. Variable leg 44 consists of a substantially horizontal section 54 attached to lower tap 42 on one end and to differential pressure detector 18 on its opposite end.

Vent leg 60 is between 0.25 and 1 inch in diameter and, preferably, has a diameter of 0.5 inches. Larger diameters enhance the flow of steam 30 in vent leg 60 but provide insufficient condensation. Smaller diameters enhance the condensation of steam 30 in vent leg 60 but provide insufficient flow area. Below a diameter of about 0.25 inches, vent leg 60 plugs too easily (the velocity of steam 30 through vent leg 60, combined with capillary effects due to the small diameter of vent leg 60, tend to create liquid slugs carried with steam 30). Although a diameter of 0.25 inches is sufficient to avoid plugging, it may result in unacceptable water level decreases in vent leg 60 due to the Taylor Instability effect. Thus, the preferred dimension of 0.5 inches represents a balance between enhanced condensation (smaller sizes work better) and the need for a sufficient flow area. Moreover, the preferred diameter assures that vent leg 60 has adequate heat transfer area to maintain the gas concentration at a value which will not outgas under any depressurization event.

Vent leg 60 can be pipe or tube. Stainless steel is suitable. The wall thickness of vent leg 60 does not materially affect heat transfer and, therefore, does not tend to affect the performance of vent leg 60.

Vent leg 60 is connected to condensing chamber 100 through vent outlet 80. Vent outlet 80 is disposed opposite steam inlet 38. As steam 30 flows through condensing chamber 100 from steam inlet 38 to vent leg 60, steam 30 sweeps the non-condensable gases from vapor space 98 into vent leg 60 and into water 20 in variable leg 44.

Vent leg 60 has a sloping portion 64, connected to condensing chamber 100 at vent outlet 80, which slants continuously downward and away from condensing chamber 100 to a vertical portion 68 of vent leg 60. The gradient of sloping portion 64, measured from horizontal, is no less than 0.25 inches per foot. A gradual, constant slope of 0.5 inches per foot solves the plugging problem and is preferred. This will ensure that the non-condensable gases entrained in steam 30 will be carried deep into vent leg 60 by precluding a water plug at a low point in vent leg 60.

Sloping portion 64 transitions to vertical portion 68 of vent leg 60 through an angle 66. Angle 66 forms a ninety-degree bend. Vertical portion 68 is as close to vertical as possible within the possible range of water-vapor interface because increased horizontal leg lengths cause signal delays; signal delays require pressure differential detector 18 to hesitate. Thus, vent leg 60 traverses the shortest possible distance between condensing chamber 100 and differential pressure detector 18. In certain applications, this requirement may prove difficult to attain; routing of pipe among complex reactor machinery may be problematic. Nevertheless, the configuration of vent leg 60 is very important; the notching phenomenon is slope and geometry dependent.

Vertical portion 68 of vent leg 60 connects with horizontal section 54 of variable leg 44 at junction 56. Through variable leg 44, water 20 in vent leg 60 returns to pressure vessel 10.

Steam inlet 38 from pressure vessel 10 to condensing chamber 100 has only one high point and slopes continuously downward from the high point at no less than 0.25 inches per foot. The high point may be at either end of steam inlet 38 or at any point between pressure vessel 10 and condensing chamber 100. This prevents forming a low spot where condensation could accumulate and interfere with the flow of steam 30 to condensing chamber 100.

Steam inlet 38 is insulated and is typically 1 inch nominal piping. Stainless steel is suitable. Insulation 40 around steam inlet 38 prevents heat loss from, and reduces condensation in, steam inlet 38. Assuming minimal heat loss from steam inlet 38, most of the condensation of steam 30 will occur in condensing chamber 100.

Condensing chamber 100 is not insulated. This allows condensing chamber 100 to perform its function: ensuring adequate water 20 to fill reference leg 16. Condensing chamber 100 is 3 inch schedule 80 piping (3.5 inch outside diameter; 2.9 inch inside diameter). Stainless steel is suitable for construction of condensing chamber 100.

Vent leg 60 also is not insulated. Although insulation would minimize heat flow into vent leg 60 (an attribute), condensation in vent leg 60 is needed to induce steam flow through condensing chamber 100 into vent leg 60. Moreover, the absence of insulation assures that vent leg 60 will not flash during rapid depressurizations. Nor is reference leg 16 insulated. This assures that reference leg 16, which is 1 inch nominal stainless steel piping, will not flash during rapid depressurizations.

The configuration of condensing chamber 100 assures that $(A_c + A_v)/A_v$ is less than 10 where $A_c$ (in ft$^2$) is the external surface area of condensing chamber 100 opposite the interior steam condensation surface inside condensing chamber 100 and $A_v$ (also in ft$^2$) is the external surface area of vent leg 60 from the water level 74 of vent leg 60 to vent outlet 80. This geometrical relationship assures that the pressure at which a bubble can form in reference leg 16 is well below atmospheric pressure (pressure appreciably below atmospheric is not expected in any realizable accident or expected operating condition).

Vent leg 60 prevents the accumulation of non-condensable gases in condensing chamber 100 by convecting them away with the steady flow of steam 30. Tests have evaluated the effectiveness of various flow rates in removing non-condensable gases while maintaining the required reference leg water level. A minimum flow rate (less than 0.1 lbm/hr) is required to remove non-condensable gases from condensing chamber 100. There is also an upper limit on the flow rate (approximately 350 lbm/hr) through condensing chamber 100 before entrainment occurs.

The operation of vent leg 60 is as follows. The water level 74 in vent leg 60 is nearly the same level as water level 22 in pressure vessel 10 for which water level is measured. Steam 30 passes through vapor space 98 of condensing chamber 100 and condenses on the interior walls of vent leg 60 as condensate 76. This condensation causes a local low pressure region in vent leg 60 and this low pressure draws the non-condensable gases in steam 30 to the vicinity of the interface where the gas is concentrated and the high gas concentration drives the gases into water 20 below the interface according to Henry's Law. (Vent leg 60 provides a critical pressure drop drawing non-condensable gases into water 20 in vent leg 60 where they diffuse into water 20 and drain back into pressure vessel 10 with the condensate from condensing chamber 50 and vent leg 60.) The condensation of steam 30 to water 20 causes water 20 to flow back into pressure vessel 10 and an equilibrium is maintained. The process has been demonstrated to work through a test program; non-condensable gases are maintained well below an acceptable level.

The primary difference between the vent to variable leg modification of the present invention and the proposed modifications of conventional water level instrumentation measurement system 1 proposed by the utility industry is the mechanism for driving non-condensable gases from condensing chamber 100. The alternative modifications depend upon positive steam flow through condensing chamber 50 induced by forces from outside condensing chamber 50. Vent leg 60 uses the actual condensing process to provide the motive force to maintain positive flow through condensing chamber 100.

The modification of vent to variable leg requires no external elements or motive force to allow the system to perform its function. As long as condensation occurs in the system, the effect of non-condensable gases will be removed from vapor space 98 of condensing chamber 100 and, therefore, those gases will be excluded from reference leg 16.

Turning to condensing chamber 100, FIG. 3 illustrates the preferred (although not essential) configuration of condensing chamber 100 used in the vent to variable leg modification of water level instrumentation measurement system 1. That configuration ensures that vent outlet 80, which provides an outlet for steam 30 (see arrow "C") from condensing chamber 100 to vent leg 60, is lower than steam entrance 82, which provides an inlet for steam 30 (see arrow "A") from steam inlet 38 to condensing chamber 100. Reference leg outlet 84 provides an outlet for water 20 (see arrow "B") from condensing chamber 100 to reference leg 16.

Vent outlet 80 is disposed concentrically about a first longitudinal axis 86; steam entrance 82 is disposed concentrically about a second longitudinal axis 88. Preferably, first longitudinal axis 86 is about 0.5 inches below second longitudinal axis 88. Thus, condensate must flow to vent leg 60, aiding the mechanism of forcing non-condensable gases in condensing chamber 100 into the condensate in vent leg 60. Overflow water 20 from condensing chamber 100 flows to vent leg 60 through vent outlet 80 and not to steam inlet 38. This maximizes the flow of water 20 available to transport dissolved, non-condensable gases back to pressure vessel 10 through variable leg 44.

The water exiting vent leg 60 and returning to pressure vessel 10 is capable of removing non-condensable gases at concentrations over 1000 ppmv. The typical concentration of non-condensable gases in pressure vessel 10 is only about 37.5 ppmv. With non-condensable gas in pressure vessel 10 at a concentration of 100 ppmv and vent leg 60 filled with non-condensable gas, water level instrumentation measurement system 1 as modified with the vent to variable leg was able to remove the non-condensable gas from vent leg 60 in approximately 3 hours.

B. Vent to Main Steam Header Modification

A second modification of water level instrumentation measurement system 1 is shown in FIGS. 4 and 5. In this vent to main steam header modification, non-condensable gases are carried into head vent line 110 through vent leg 160 by the flow of steam 30. Head vent line 110 connects to the main steam line and the drywell equipment drain tank (not shown).

Vent leg 160 is attached on one end to vapor space 148 of condensing chamber 150 through vent outlet 180. Vent leg 160 connects on its opposite end to head vent line 110. The flow of steam 30 through head vent line 110 to the main steam line, under both normal and reduced power conditions, induces sufficient flow via the pressure losses to positively vent condensing chamber 150. Analysis and testing have shown that the minimum (about 0.1 lbm/hr at start up) and maximum (about 250 lbm/hr at normal operation) steam flow rates expected to occur through condensing chamber 150 are sufficient to remove any non-condensable gases and do not cause any appreciable entrainment of reference leg water. Because the vent to main steam header modification depends on steam flow (the concept of positive flow through condensing chamber 150), not condensation, insulation is required to minimize condensation in vent leg 160. Consequently, head vent line 110 and vent leg 160 are surrounded by insulation 40. Vent leg 160 is preferably 1 inch nominal piping, large enough to assure adequate flow of steam 30 through vent leg 160.

The primary difference between the vent to main steam header modification and other changes proposed by utilities to conventional water level instrumentation measurement system 1 is the path which vent leg 160 takes to form a positive vent and the requirements placed on vent leg 160 to assure that the vent is operational. Vent leg 160 must be 1 inch or greater in diameter and vent leg 160 must be insulated to maximize the steam flow through condensing chamber 150 and to minimize the condensation which occurs in vent leg 160. Condensation in vent leg 160 would make it possible, particularly under low power conditions, for steam 30 to enter vent leg 160 from both ends of vent leg 160 and to cause non-condensable gases to accumulate at the high point in the vent line, which is condensing chamber 150.

The difference in the location which vent leg 160 connects to head vent line 110 is also an important difference between the modification and the utilities' proposed changes to conventional water level instrumentation measurement system 1. Pursuant to the modification, vent leg 160 ties into head vent line 110 which then continues on to the main steam line. In the changes proposed by the utilities, the vent leg was connected directly to the main steam line. Connecting to head vent line 110 significantly reduces the pressure fluctuations seen in condensing chamber 150. These pressure fluctuations cause significant signal inaccuracy and noise. Moreover, simplicity of pipe routing is achieved.

Turning to condensing chamber 150, vent outlet 180 provides an outlet for steam 30 (see arrow "F") from condensing chamber 150 to vent leg 160. Steam entrance 182 provides an inlet for steam 30 (see arrow "D") from steam inlet 38 to condensing chamber 150. To increase the steam flow rate through condensing chamber 150, a concentric reducer 190 is provided at steam entrance 182. Reference leg outlet 184 provides an outlet for water 20 (see arrow "E") from condensing chamber 150 to reference leg 16.

Vent outlet 180 is at least at the same elevation (or higher) than steam entrance 182. Preferably, vent outlet 180 and steam entrance 182 are each concentrically disposed around the same longitudinal axis 186 and, therefore, have the same elevation to assure adequate flow of steam 30 to remove non-condensable gases. Vent outlet 180 cannot be lower than steam entrance 182 because water 20 must not flow into vent leg 160; rather, water 20 should flow back to pressure vessel 10.

The water surface 146 inside condensing chamber 150 never rises above the bottom edge of steam entrance 182. This is because the upward incline of steam inlet 38 allows steam inlet 38 to serve as a drain pipe. Excess condensate returns to pressure vessel 10 through steam inlet 38. In this configuration, steam inlet 38 is typically 2 inch nominal piping.

Condensing chamber 150 is not insulated. This allows condensing chamber 150 to perform its function: ensuring adequate water 20 to fill reference leg 16. Condensing chamber 150 is 3 inch schedule 80 piping (3.5 inch outside diameter; 2.9 inch inside diameter). Stainless steel is suitable for construction of condensing chamber 150.

Boiling water reactors typically have either two or four redundant condensing chambers for narrow and wide range or fuel zone and shutdown range water level measurements. The narrow and wide range condensing chambers are calibrated to provide correct readings at 1,000 psig; the fuel zone and shutdown range condensing chambers are calibrated to be correct at pressure vessel depressurized conditions. The diversity of available condensing chambers provides operators with several water level indications. The redundant condensing chambers coincide with the instrumentation channels and logic having electrical and mechanical divisional assignments.

Baseline tests indicate that the concentration of non-condensable gases increases with time for boiling water reactor condensing chambers. The baseline test results are markedly different from the results of tests conducted with the modifications of the present invention which prevent the accumulation of non-condensable gases. It is clear that the vent to variable leg and vent to main steam header modifications of the condensing chambers provide a mechanism for non-condensable gas removal.

Removing the non-condensable gases from the vapor space of the condensing chamber, as this invention does, reduces the possibility that non-condensable gases can accumulate in the reference leg and, therefore, eliminates the level measurement errors caused when the gases come out of solution during any depressurization process. Tests on the modifications of the present invention have found low concentrations (less than 200 ppmv) of non-condensable gases in reference leg 16. Such low concentrations cause negligible error after any depressurization.

The two modifications to water level instrumentation measurement system 1 of the present invention, namely the vent to variable leg and vent to main steam header modifications, can be adopted either alone or in combination. Thus, a non-condensable gas tolerant condensing chamber modified pursuant to the vent to variable leg modification may be incorporated in one or more of the condensing chambers used in, for example, a boiling water reactor while the vent to main steam header modification may be incorporated in one or more other condensing chambers. Which modification and which combination of modifications will prove most advantageous depends upon the specific plant configuration.

Although illustrated and described herein with reference to certain specific embodiments, the present invention is nevertheless not intended to be limited to the details shown. Rather, various modifications may be made in the details within the scope and range of equivalents of the claims and without departing from the spirit of the invention. The invention will work, for example, in any application where a need exists to measure liquid levels under high pressure while avoiding the effect of non-condensable gases. It is not restricted to steam and water. Nor is it restricted to the utility industry.

What is claimed is:

1. A liquid level instrumentation measurement system for measuring the level of liquid under high pressure in a pressure vessel containing liquid and vapor with non-condensable gases and having a lower tap connected to the pressure vessel at a point below the lowest liquid level to be measured; an upper tap connected to the pressure vessel at a point above the highest liquid level to be measured; a reference leg outside the pressure vessel extending substantially from the level of the lower tap to a point above the upper tap; a condensing chamber at the upper end of the reference leg defining a vapor space in which vapor condenses to keep the reference leg filled with liquid; a vapor inlet extending between the upper tap and a vapor entrance in the condensing chamber through which vapor passes from the pressure vessel to the condensing chamber; a variable leg connected to the lower tap on one end; and a differential pressure detector connected to the variable leg on its end opposite the lower tap and to the lower end of the reference leg for generating a signal proportional to the level of liquid in the pressure vessel; the improvement comprising:

a vent outlet disposed in the condensing chamber opposite the vapor entrance; and a vent leg disposed between said vent outlet in the condensing chamber and the variable leg, said vent leg removing the non-condensable gases from the vapor space of the condensing chamber and having:
(a) a sloping portion slanting continuously downward and away from said vent outlet, and
(b) a vertical portion extending between said sloping portion and said variable leg.

2. A liquid level instrumentation measurement system according to claim 1 wherein said sloping portion of said vent leg has a gradient of about 0.5 inches per foot.

3. A liquid level instrumentation measurement system according to claim 1 wherein said vent leg has an inside diameter of between 0.25 and 1.0 inches.

4. A liquid level instrumentation measurement system according to claim 3 wherein said vent leg has an inside diameter of about 0.5 inches.

5. A liquid level instrumentation measurement system according to claim 1 wherein the vapor inlet is thermally insulated while the condensing chamber and said vent leg are thermally uninsulated.

6. A liquid level instrumentation measurement system according to claim 1 wherein said vent outlet of the condensing chamber is lower than the vapor entrance of the condensing chamber.

7. A liquid level instrumentation measurement system according to claim 6 wherein said vent outlet is disposed concentrically about a first longitudinal axis, the vapor entrance is disposed concentrically about a second longitudinal axis, and said first longitudinal axis is below said second longitudinal axis.

8. A liquid level instrumentation measurement system according to claim 7 wherein said first longitudinal axis is about 0.5 inches below said second longitudinal axis.

9. An apparatus comprising:

a pressure vessel for a nuclear reactor containing water and steam with non-condensable gases;

a lower tap located on said pressure vessel at a point below the lowest level of water to be measured;

an upper tap located on said pressure vessel at a point above the highest level of water to be measured;

a reference leg outside said pressure vessel extending substantially from the level of said lower tap to a point above said upper tap;

a condensing chamber at the upper end of said reference leg having:
(a) a steam entrance on one end through which steam passes from said pressure vessel to said condensing chamber,
(b) a vent outlet on its opposite end, and
(c) a steam space between said steam entrance and said vent outlet in which steam condenses to keep said reference leg filled with water;

a steam inlet extending between said upper tap and said steam entrance of said condensing chamber;

a variable leg connected to said lower tap on one end;

a differential pressure detector connected to said variable leg on its end opposite said lower tap and to the lower end of said reference leg for generating a signal proportional to the level of water in said pressure vessel;

a vent leg disposed between said vent outlet of said condensing chamber and said variable leg, said vent leg removing the non-condensable gases from said steam space of said condensing chamber and having:
(a) a sloping portion slanting continuously downward and away from said vent outlet, and
(b) a vertical portion extending between said sloping portion and said variable leg.

10. An apparatus according to claim 9 wherein said sloping portion of said vent leg has a gradient of about 0.5 inches per foot.

11. An apparatus according to claim 9 wherein said vent leg has an inside diameter of between 0.25 and 1.0 inches.

12. An apparatus according to claim 11 wherein said vent leg has an inside diameter of about 0.5 inches.

13. An apparatus according to claim 9 wherein said steam inlet is thermally insulated while said condensing chamber and said vent leg are thermally uninsulated.

14. An apparatus according to claim 9 wherein said vent outlet of said condensing chamber is lower than said steam entrance of said condensing chamber.

15. An apparatus according to claim 14 wherein said vent outlet is disposed concentrically about a first longitudinal axis, said steam entrance is disposed concentrically about a second longitudinal axis, and said first longitudinal axis is below said second longitudinal axis.

16. An apparatus according to claim 15 wherein said first longitudinal axis is about 0.5 inches below said second longitudinal axis.

* * * * *